(12) United States Patent
Ramsey (10) Patent No.: US 9,150,072 B2
(45) Date of Patent: Oct. 6, 2015

(54) HEAVY-DUTY VEHICLE AXLE/SUSPENSION SYSTEM WITH COMPOSITE BEAM

(71) Applicant: Hendrickson USA, L.L.C., Itasca, IL (US)

(72) Inventor: John E. Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/534,269

(22) Filed: Nov. 6, 2014

(65) Prior Publication Data

US 2015/0130157 A1    May 14, 2015

Related U.S. Application Data

(60) Provisional application No. 61/904,108, filed on Nov. 14, 2013.

(51) Int. Cl.
*B60G 7/00* (2006.01)
*B60G 9/00* (2006.01)
(Continued)

(52) U.S. Cl.
CPC ............... *B60G 7/001* (2013.01); *B60G 7/008* (2013.01); *B60G 7/02* (2013.01); *B60G 9/003* (2013.01); *B60G 11/27* (2013.01); *B60G 2200/31* (2013.01); *B60G 2202/152* (2013.01); *B60G 2204/143* (2013.01); *B60G 2204/148* (2013.01); *B60G 2206/013* (2013.01); *B60G 2206/10* (2013.01); *B60G 2206/601* (2013.01); *B60G 2206/7101* (2013.01); *B60G 2300/026* (2013.01)

(58) Field of Classification Search
CPC .......... B60G 9/003; B60G 7/02; B60G 7/008; B60G 2206/10; B60G 2204/148; B60G 2206/7101; B60G 2200/31; B60G 2206/013
See application file for complete search history.

(56) References Cited

U.S. PATENT DOCUMENTS

| 2,971,772 A | 2/1961 | Tantlinger et al. |
| 3,140,880 A | 7/1964 | Masser |

(Continued)

FOREIGN PATENT DOCUMENTS

| EP | 0243191 A1 | 10/1987 |
| EP | 0152914 B1 | 10/1989 |

(Continued)

OTHER PUBLICATIONS

Photograph of a trailing arm air suspension with a composite beam bolted to the axle, manufactured by BPW Bergische Achsen KG, which is located in Germany. Photograph was taken in about Nov. 2003.

(Continued)

*Primary Examiner* — Faye M Fleming
(74) *Attorney, Agent, or Firm* — Dureska, Kennedy & Moore, L.L.C.; David P. Dureska; Edward T. Kennedy (57) ABSTRACT

The invention relates to an axle/suspension system that includes a composite beam and separately pultruded axle connection and bushing end brackets. The composite beam has an internal support with vertical stitching to minimize delamination, which is lightweight and maintains rigidity of the beam while still maintaining flexibility. The beam includes a pair of ends. The axle connection bracket is connected to one end of the beam and captures the axle. The bushing end bracket is connected to the other end of the beam and is connected to a hanger of the heavy-duty vehicle.

22 Claims, 5 Drawing Sheets

(51) Int. Cl.
 *B60G 7/02* (2006.01)
 *B60G 11/27* (2006.01)

(56) References Cited

U.S. PATENT DOCUMENTS

| | | | |
|---|---|---|---|
| 3,895,819 | A | 7/1975 | Willetts |
| 3,964,764 | A | 6/1976 | Rickardsson |
| 4,134,604 | A | 1/1979 | Jackson |
| 4,166,640 | A | 9/1979 | Van Denberg |
| 4,313,618 | A | 2/1982 | Robinson |
| 4,334,696 | A | 6/1982 | Bergstrom |
| 4,889,361 | A | 12/1989 | Booher |
| 5,046,752 | A | 9/1991 | Stephens et al. |
| 5,171,036 | A | 12/1992 | Ross |
| 5,301,931 | A | 4/1994 | Bigo |
| 5,346,247 | A | 9/1994 | Snyder |
| 5,597,629 | A | 1/1997 | Johnson |
| 5,617,692 | A | 4/1997 | Johnson et al. |
| 5,644,888 | A | 7/1997 | Johnson |
| 5,749,198 | A | 5/1998 | Johnson |
| 5,788,263 | A | 8/1998 | VanDenberg |
| 5,795,424 | A | 8/1998 | Johnson et al. |
| 6,056,305 | A | 5/2000 | Pribyl |
| 6,158,773 | A | 12/2000 | Verhaeghe |
| 6,286,857 | B1 | 9/2001 | Reese et al. |
| 6,324,940 | B1 | 12/2001 | Pazdirek et al. |
| 6,543,857 | B1 | 4/2003 | Griffiths et al. |
| 6,634,673 | B1 | 10/2003 | Verhaeghe |
| 6,645,333 | B2 | 11/2003 | Johnson et al. |
| 6,676,785 | B2 | 1/2004 | Johnson et al. |
| 7,056,576 | B2 | 6/2006 | Johnson |
| 7,105,071 | B2 | 9/2006 | Johnson et al. |
| 7,455,306 | B2 | 11/2008 | Ramsey et al. |
| 7,731,211 | B2 | 6/2010 | Ramsey |
| 2003/0001376 | A1 | 1/2003 | Verhaeghe |
| 2003/0184074 | A1 | 10/2003 | Verhaeghe |
| 2004/0137231 | A1 | 7/2004 | Johnson et al. |
| 2004/0256820 | A1 | 12/2004 | Chalin et al. |
| 2004/0256829 | A1 | 12/2004 | Chalin et al. |
| 2005/0006869 | A1 | 1/2005 | Hughes |
| 2005/0082783 | A1 | 4/2005 | Ramsey et al. |
| 2006/0244234 | A1* | 11/2006 | Ramsey ............ 280/124.131 |
| 2014/0306418 | A1* | 10/2014 | Ottinger et al. ..... 280/124.153 |

FOREIGN PATENT DOCUMENTS

| | | |
|---|---|---|
| EP | 0650860 B1 | 10/1994 |
| GB | 2147254 | 5/1985 |
| JP | 04159110 A | 6/1992 |
| WO | 8600266 | 1/1986 |
| WO | 8600854 | 2/1986 |
| WO | 8706540 | 11/1987 |
| WO | 0153779 A1 | 7/2001 |
| WO | 0242099 A1 | 5/2002 |
| WO | 03093680 A1 | 11/2003 |
| WO | 03097335 A1 | 11/2003 |
| WO | 2004088073 A1 | 10/2004 |
| WO | 2005025900 A1 | 3/2005 |
| WO | 2005037579 A2 | 4/2005 |

OTHER PUBLICATIONS

DaimlerChrysler brochure entitled "New DCA Trailer Axle System," published in Germany. Date of publication brochure is uncertain. System believed to be known to the public as of about Apr. 2003.

* cited by examiner

HEAVY-DUTY VEHICLE AXLE/SUSPENSION SYSTEM WITH COMPOSITE BEAM

CROSS-REFERENCE TO RELATED APPLICATION

This application claims the benefit of U.S. Provisional Patent Application Ser. No. 61/904,108, filed Nov. 14, 2013.

BACKGROUND OF THE INVENTION

1. Field of the Invention

The present invention relates to the art of axle/suspension systems for vehicles. More particularly, the invention relates to the art of trailing or leading arm air-ride axle/suspension systems for heavy-duty vehicles, such as tractor-trailers or semi-trailers, which cushion the ride and stabilize the vehicle during operation. Still more particularly, the invention relates to an axle/suspension system that includes a composite beam and a pair of separately pultruded brackets. The composite beam has an internal support with vertical stitching to minimize delamination, which is lightweight and maintains rigidity of the beam while still maintaining flexibility.

2. Background Art

Heavy-duty vehicles that transport freight, such as tractor-trailers or semi-trailers and straight trucks, typically include leading or trailing arm air-ride suspension assemblies that connect the axles of the vehicle to the frame of the vehicle. These air-ride suspension assemblies use air springs to cushion the ride of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle primary frames, movable subframes and non-movable subframes.

In the heavy-duty vehicle art, one or more axle/suspension systems usually are suspended from a single slider box. It is understood that a slider box outfitted with usually two axle/suspension systems typically is referred to as a slider tandem, and for purposes of convenience and clarity, will hereinafter be referred to as a slider tandem. Of course, a slider box may also be outfitted with a single axle/suspension system, or three or more axle/suspension systems. By way of example, reference herein shall be made to a slider tandem having a pair of axle/suspension systems mounted thereon, with the understanding that such reference also applies to a slider outfitted with one, three or more axle/suspension systems. The slider tandem in turn is mounted on the underside of the trailer primary frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits.

A slider box or other subframe typically includes a pair of longitudinally-extending, parallel, transversely-spaced elongated main members. A plurality of longitudinally-spaced parallel cross members extend transversely between and are attached to the main members. Pairs of transversely-spaced hangers are mounted on and depend from the main members and selected ones of the cross members. An axle/suspension system typically includes a pair of transversely-spaced trailing arm beams, each of which is pivotally connected at its front end to a respective one of the hangers. Each trailing arm beam also is welded or otherwise rigidly attached at its rear end to a transversely-extending axle of the axle/suspension system. The wheels of the vehicle are rotatably mounted, as known in the art, to opposing ends of the axle. The axle/suspension system further conventionally includes a pair of air springs, which each extend between and are mounted on the rear end of a respective one of the beams and a respective one of the main members, and a pair of shock absorbers, which each extend between and are mounted on a respective one of the beams and a respective one of the main members. It should be noted that, while the hangers are sometimes considered to be part of the vehicle frame once they are connected to the frame members, they are typically engineered as part of the axle/suspension system.

The axle/suspension system of the heavy-duty vehicle also acts to cushion the ride and stabilize the vehicle. More particularly, as the vehicle is traveling over-the-road, its wheels encounter road conditions that impart various forces, loads and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to absorb at least some of them.

These forces include vertical forces caused by vertical movement of the wheels as they encounter certain road conditions, fore-aft forces caused by acceleration and deceleration of the vehicle, and side-load and roll forces associated with transverse vehicle movement, such as turning of the vehicle and lane-change maneuvers. In order to address such disparate forces, axle/suspension systems have differing structural requirements. More particularly, it is desirable for an axle/suspension to minimize the amount of sway experienced by the vehicle and thus provide what is known in the art as roll stability. However, it is also desirable for an axle/suspension system to be relatively flexible to assist in cushioning the vehicle from vertical impacts and to provide compliance so that the components of the axle/suspension system resist failure.

In the past, prior art beams were formed of a rigid, heavy material such as steel and was connected to a hanger with a compliant bushing. The rigid, heavy material undesirably led to increased weight to an axle/suspension system that undesirably increased operating costs.

In order to decrease weight, prior art composite beams were developed for axle/suspension systems. Prior art composite beams desirably reduced weight to the axle/suspension system but included some other disadvantages. First, some prior art composite beams can delaminate over time, which is the separation of the composite layers. Delamination is undesirable because it compromises the structural integrity of the beam. As a result, it is desirable for a suspension assembly for an axle/suspension system having composite beams to minimize possible delamination of the beam.

In addition, prior art composite beams often employ expensive manufacturing processes, such as vacuum injection molding and reaction injection molding, and other techniques known in the art. Such prior art processes make composite beams undesirably expensive to employ. As a result, it is desirable for each composite beam of an axle/suspension system, including a bushing end housing and axle connection housing, to be manufactured through a cost-effective process.

Therefore, a need exists in the art for an improved axle/suspension system which balances the rigidity of the composite beam to minimize the sway experienced by the vehicle, with flexibility to assist in cushioning the vehicle from vertical forces. Further, it is desirable to minimize the potential likelihood of delamination of the composite beam which can possibly occur over time in composites. In addition, it is desirable to manufacture a composite beam, including a bushing end housing and an axle connection housing, via a cost-effective process. The heavy-duty vehicle axle/suspension system with composite beam of the present invention satisfies these needs, as will be described in detail below.

SUMMARY OF THE INVENTION

An objective of the present invention includes providing an improved axle/suspension system which balances the rigidity of the composite beam to minimize the sway experienced by the vehicle, with flexibility to assist in cushioning the vehicle from vertical forces.

Another objective of the present invention includes providing an axle/suspension system with a composite beam that desirably minimizes the potential for delamination of the beam.

A further objective of the present invention is to provide a cost-effective process for manufacturing a relatively lightweight composite beam of the axle/suspension system, and its respective bushing end housing and axle connection housing.

These objectives and advantages are obtained by an axle/suspension system for a heavy-duty vehicle of the present invention. In an exemplary embodiment of the invention, the axle/suspension system for a heavy-duty vehicle, the vehicle having a frame extending in a longitudinal direction relative to the vehicle, the axle/suspension system being attached to the vehicle frame by at least one hanger. The axle/suspension system comprising an axle extending in a transverse direction relative to the vehicle. At least one beam including a first end and a second end, the beam being formed of a composite material and being formed with a plurality of vertically-extending openings. There is at least one fiber and the fiber extends through at least one of the vertically-extending openings. An axle connection housing extending and being rigidly connected to the second end of the beam and the axle and a bushing end housing extending between and being connected to the first end of the beam and the hanger.

BRIEF DESCRIPTION OF THE SEVERAL VIEWS OF THE DRAWINGS

The preferred exemplary embodiment of the present invention, illustrative of the best mode in which Applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

The heavy-duty axle/suspension system with composite beam of the present invention solves the problems associated with the prior art by orienting the laminate of the beam in a specific pattern to maintain rigidity of the composite beam while still maintaining flexibility and producing lightweight characteristics. In addition, the composite beam for heavy-duty vehicle axle/suspension systems of the present invention includes vertical stitching to minimize the possibility of delamination that can occur within composites over time. Moreover, the composite beam for heavy-duty vehicle axle/suspension systems of the present invention includes a composite beam and respective bushing end housing and axle connection housing that are separately manufactured via a cost-effective process.

Figure 1:
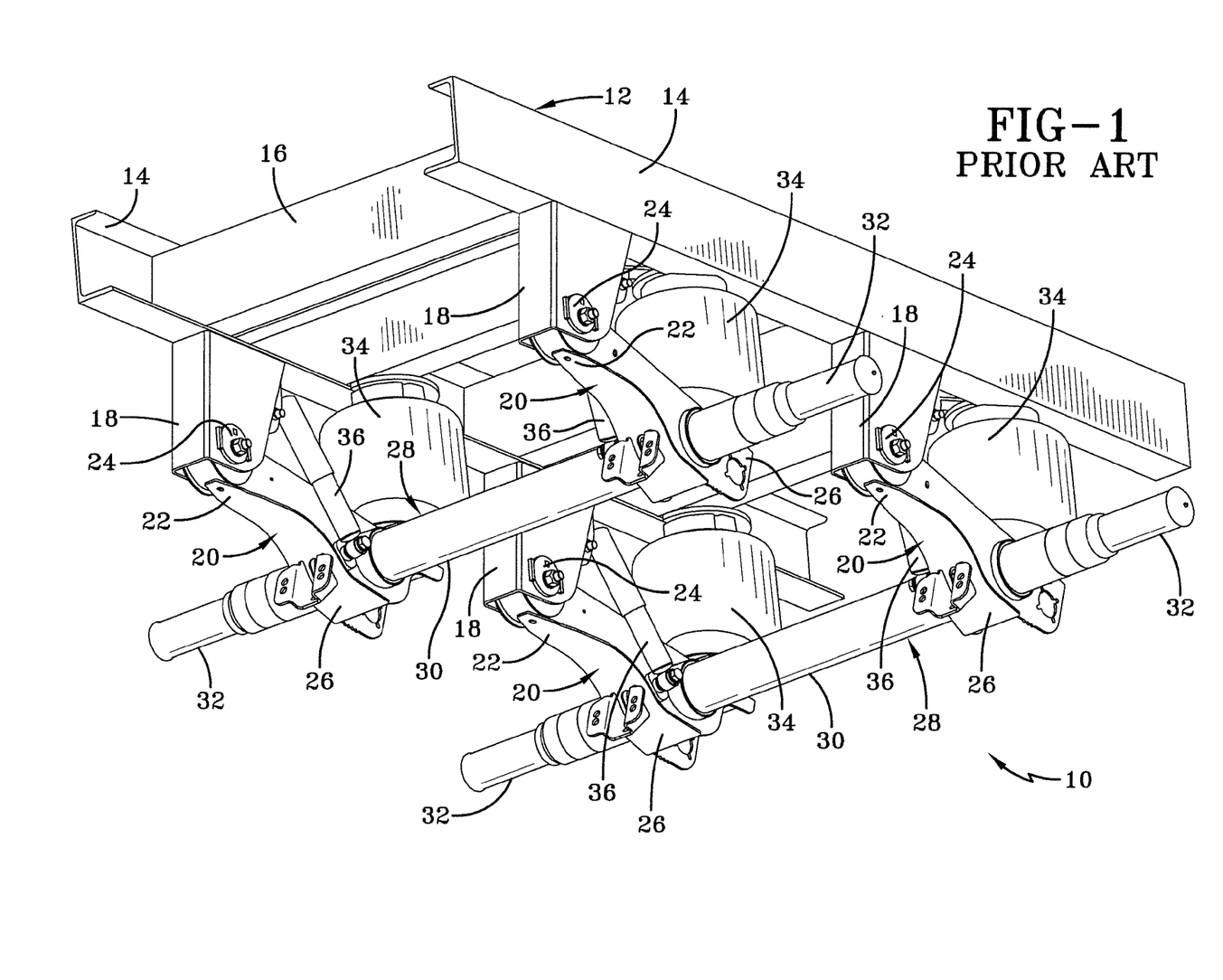
FIG. 1 is a driver's side bottom front perspective view of a prior art slider tandem, including a subframe with depending hangers, shown supporting a pair of axle/suspension systems.

In order to better understand the heavy-duty vehicle axle/suspension system of the present invention, a prior art trailing arm-type air-ride axle/suspension system, indicated generally at 10, is shown in FIG. 1 mounted on a vehicle frame 12, which generally is representative of various types of frames used for heavy-duty vehicles, including primary frames that do not support a subframe and primary frames and/or floor structures that do support a subframe. For primary frames and/or floor structures that do support a subframe, the subframe can be nonmovable or movable, the latter being commonly referred to as a slider box. For the purpose of convenience, frame 12 is shown in FIG. 1 as a non-movable subframe.

More specifically, frame 12 includes a pair of elongated, longitudinally-extending, parallel, transversely-spaced main members 14. A plurality of longitudinally-spaced parallel cross members 16 extend transversely between and are attached to main members 14. Pairs of transversely spaced hangers 18 are mounted on and depend from main members 14 and selected ones of cross members 16. It should be noted that, while hangers 18 are sometimes considered to be part of frame 12 once they are connected to main members 14 and selected ones of cross members 16, they are typically engineered as part of axle/suspension system 10.

Axle/suspension system 10 is pivotally connected to hangers 18 via a pair of transversely-spaced trailing arm beams 20. Specifically, each trailing arm beam 20 includes a front end 22 having a bushing assembly 24, which includes a bushing, pivot bolts and washers as is well-known in the art and will be described below, to facilitate pivotal connection of the beam to a respective one of hangers 18. Each beam 20 also includes a rear end 26, which is welded or otherwise rigidly attached to a transversely-extending axle 28. Axle 28 includes an axle tube 30 generally extending between beams 20, and a pair of spindles 32 each attached to the central tube and extending outboardly from a respective one of the beams.

Axle/suspension system 10 also includes air springs 34, each of which extends between and is mounted on rear end 26 of a respective one of beams 20 and a respective one of main members 14. A pair of shock absorbers 36, each of which extends between and is mounted on a respective one of beams 20 and a respective one of frame main members 14, also is a component of prior art axle/suspension system 10.

As previously mentioned, prior art axle/suspension system 10 is designed to absorb forces that act on the vehicle as it is operating. More particularly, it is desirable for axle/suspension system 10 to resist roll forces and thus provide roll stability for the vehicle. This is typically accomplished by using beam 20, which is rigid, and also is rigidly attached to axle 28. It is also desirable, however, for axle/suspension system 10 to be flexible to assist in cushioning a vehicle from vertical impacts and to provide compliance so that the axle/suspension system resists failure. Such flexibility typically is sought through the pivotal connection of beam 20 to hanger 18 with bushing assembly 24, and although it accomplishes this function, it adds undesirable weight and cost to axle/suspension system 10.

In order to decrease weight to axle/suspension system and thus lower operating costs, composite beams were developed. One such composite beam includes prior art composite beam 52 installed on an axle/suspension system 50 shown in FIG. 2. Prior art composite beam 52 desirably balances the rigidity of the beam to minimize the amount of sway experienced by the vehicle and the flexibility to assist in cushioning the vehicle.

Figure 2:
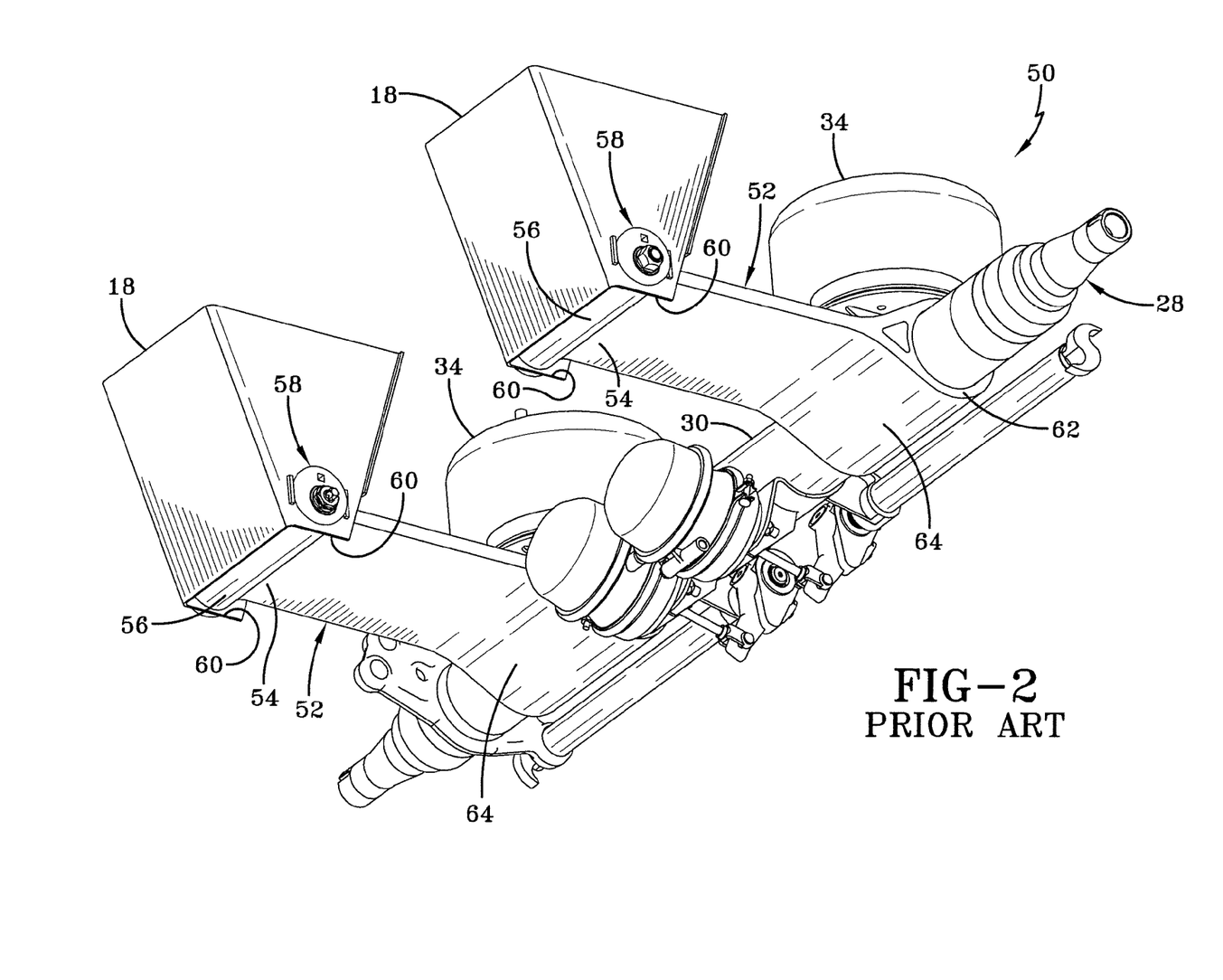
FIG. 2 is a driver side bottom front perspective view of another prior art heavy duty axle/suspension system that utilizes composite beams.

Prior art axle/suspension system 50 includes a pair of composite beams 52, formed by a pultrusion process, each having a front end 54 formed with a cylindrical member 56 that accepts a bushing assembly 58. Cylindrical member 56 is integrally formed as a part of composite beam 52, or may be formed separately, and connected to front end 54 of the beam.

Each hanger 18 is formed with a lower rear opening 60, which receives beam front end 54 and thus beam cylindrical member 56. To attach beam front end 54 to hanger 18, bushing assembly 58 includes a rigid tube (not shown) that is slip-fit into an opening (not shown) formed in cylindrical member 56.

To connect each composite beam 52 to axle 28, a sleeve 62 is integrally formed at a rear end 64 of the beam near air spring 34, and immovably captures axle tube 30. Composite layers of beam 52 extend from hanger 18 rearwardly to and generally wrap about the upper, rear and lower surfaces of sleeve 62 to capture it, and then return to the hanger. The composite layers of beam 52 are arranged with layers of 0, 90, and 45 degrees to provide for reduction in weight while maintaining strength. Further, any cross section of beam 52 taken perpendicular to axle 28 is the same and the layers of 0, 90, and 45 degrees are consistent top to bottom. The use of composite material in beam 52 allows for a desirable reduction in weight when compared to prior art axle/suspension system beams 20, but such composites include some disadvantages.

First, prior art composite beam 52 can delaminate over time, which is the separation of the composite layers. Delamination undesirably compromises the structural integrity of prior art composite beam 52. Moreover, prior art composite beam 52 is manufactured by an expensive process such as vacuum injection molding and reaction injection molding, and other techniques known in the art.

Therefore, a need exists in the art for an improved heavy-duty vehicle axle/suspension system that is lightweight, balances the competing demands of roll stability and flexibility for compliance, minimizes the potential of delamination of the suspension assembly beam composite material that could occur over time, and allows for the composite beam and respective bushing housing and axle connection housing brackets to be manufactured separately through economical processes. The heavy-duty vehicle axle/suspension system with composite beam of the present invention accomplishes these needs, as will now be described.

Figure 3:
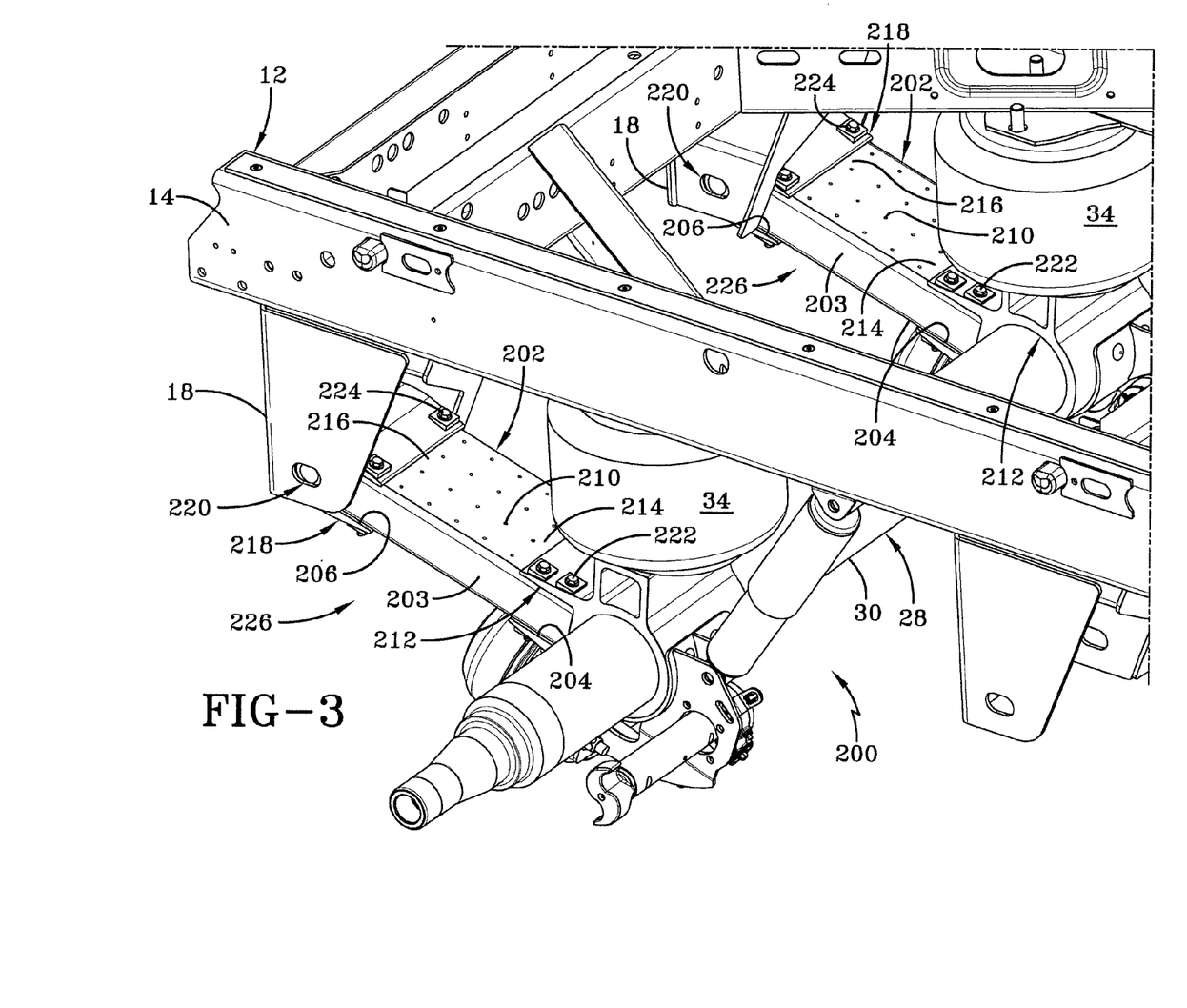
FIG. 3 is a fragmentary rear top driver side perspective view of a preferred exemplary embodiment heavy-duty vehicle axle/suspension system of the present invention, showing a pair of composite beams.
Figure 4:
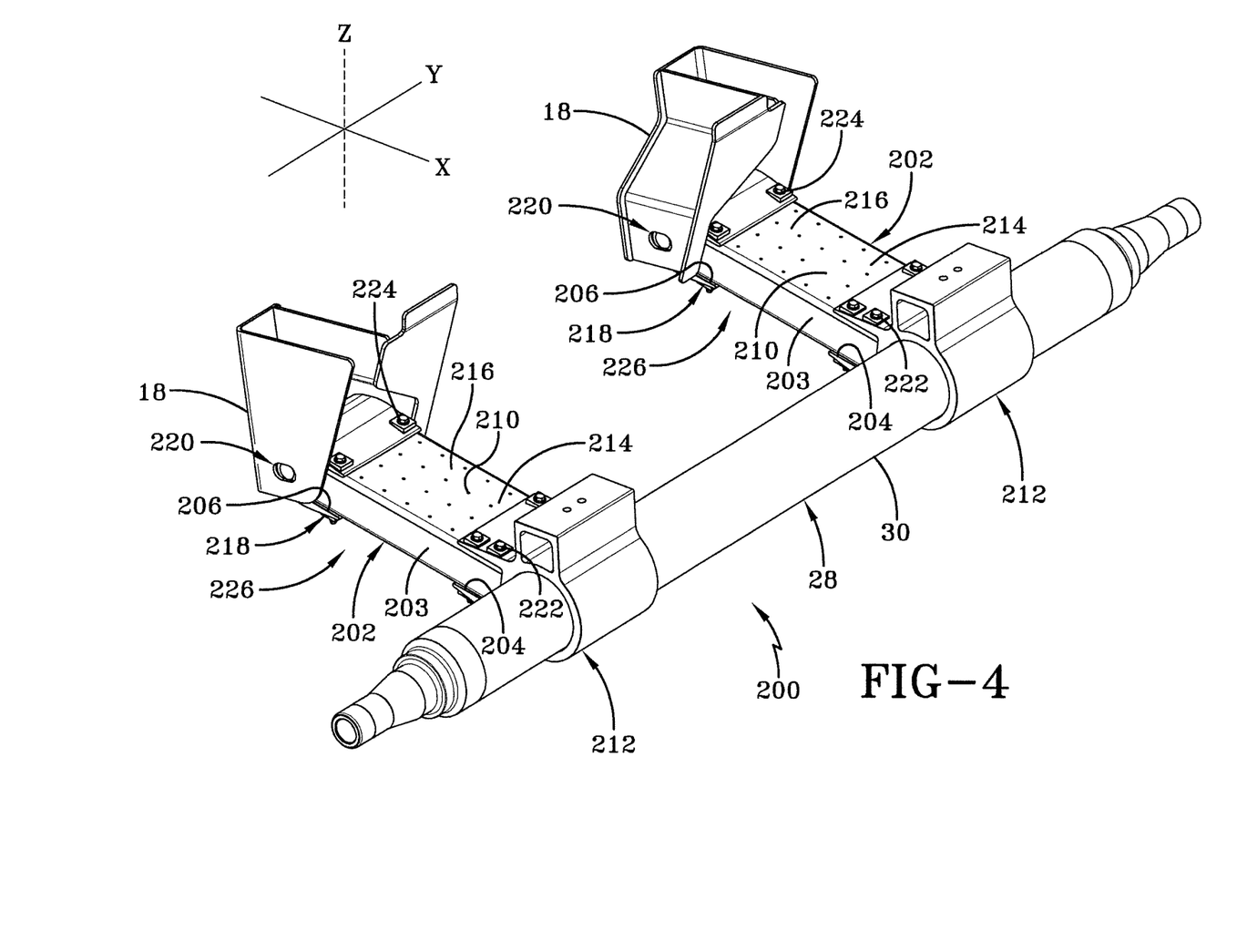
FIG. 4 is a rear driver side perspective view of the preferred exemplary embodiment heavy-duty vehicle axle/suspension system of the present invention, showing the pair of composite beams pivotally connected to the hanger and connected to a transversely extending axle.

Turning to FIGS. 3-4, a preferred exemplary embodiment axle/suspension system 200 of the present invention is shown, and includes a pair of suspension assemblies 226. Each suspension assembly 226 includes a longitudinally extending, transversely-spaced parallel composite beam 202, which is pivotally connected to a respective transversely-spaced hanger 18 and extends rearwardly therefrom to immovably capture axle 28. Although a pair of generally identical beams 202 is utilized, for the sake of brevity and clarity, only one will be discussed. Beam 202 is generally manufactured through a pultrusion process by being pultruded in a direction perpendicular to the transverse length of axle 28. Beam 202 ranges in height from about 3 inches to about 5 inches and is about 7 inches to about 9 inches wide.

Beam 202 includes an outer shell 203 (FIG. 5), ranging in thickness from about 0.2 inches to about 0.3 inches, that is generally composed of a composite such as a thermoset composite. Additionally, outer shell 203 includes mats of fibers oriented at 0, 90, and 45 degrees such that the orientation of the fibers can be optimized for the most effective roll resistance. The mats of fibers oriented at different degrees provide directional related strength. Outer shell 203 of beam 202 has a substantially constant cross-section in a lateral or transverse direction relative to vehicle frame 12, which facilitates the beam being manufactured through processes including pultrusion.

Figure 5:
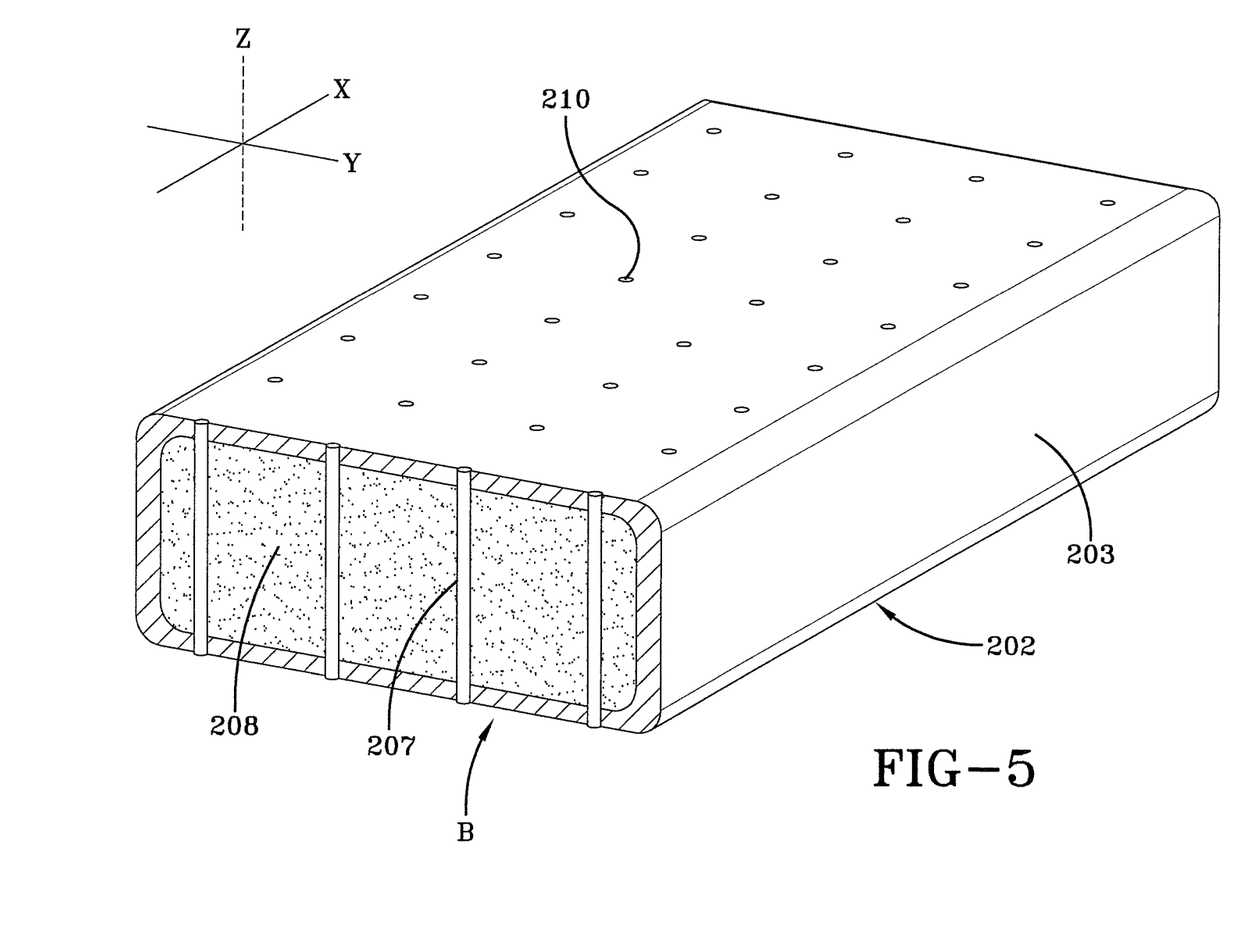
FIG. 5 is a transverse cross-sectional longitudinal perspective view of the composite beam of the preferred exemplary embodiment heavy-duty vehicle axle/suspension system of the present invention shown in FIGS. 3-4.

As most clearly seen in FIG. 5, beam 202 also includes a support 208, generally composed of foam resin that hardens during manufacturing, and is formed within outer shell 203. It is contemplated that support 208 may also include internal composite ribs without changing the overall concept or operation of the present invention. Support 208 is generally lightweight, includes a foam resin that has a range of densities, and conforms to the shape of the outer shell 203 to help to maintain the strength of beam 202. Support 208 helps to maintain the shape of beam 202 so that the beam can effectively absorb some of the forces that are directed into the beam of the present invention. In addition, support 208, as a result of its density, contributes to the reduced weight of beam 202 of the present invention.

In addition to support 208, another important aspect of axle/suspension system 200 is that beam 202 of the present invention includes a plurality of vertically-oriented openings 210. More specifically, during the pultrusion process, beam 202 is pierced by inserting a reinforced vertical stitching, namely a vertical reinforcing fiber 207, creating openings 210. Reinforcing fiber 207 is generally disposed through outer shell 203 and support 208 of beam 202, and exiting the outer shell of the beam, as indicated by B. In this manner, openings 210 are generally aligned with one another through outer shell 203 and support 208 of beam 202. Reinforcing fiber 207 may include separate fibers disposed through each opening 210 and/or one continuous fiber disposed through each of the openings. In this manner, outer shell 203 and support 208 of beam 202 are secured by reinforcing fiber 207 to increase strength along the z-axis in relation to the beam of the present invention, and to minimize the possibility of delamination, which can occur with composite materials. Moreover, reinforcing fiber 207 increases the resistance to roll-type forces without measurably adding to the weight of beam 202. Further, the structure of outer shell 203 and support 208 of beam 202 provide compliance while still maintaining the resistance to roll-type forces without the increased weight of prior art beam 20.

Preferably, beam 202 of preferred exemplary embodiment axle/suspension system 200 is designed to experience stresses in a lower range than prior art axle/suspension system beams 20, 52 by being neutral, or generally unstressed, when a trailer (not shown) is unloaded or loaded with freight and the axle/suspension system is maintaining vehicle ride height. By being neutral at ride height for the loaded trailer, beam 202 facilitates air springs 34 (FIG. 3) to provide optimum ride cushioning. Therefore, when a loaded trailer experiences impacts from traveling over-the-road, beam 202 experiences relatively low stresses, which reduces the fatigue on axle/suspension system 200. Such reduction of stress and fatigue extends the life of beam 202 and reduces the chances of delamination of the beam.

Turning to FIGS. 3-4, the connection of beam 202 to axle 28 includes an axle connection housing 212 or bracket. It is important to note that axle connection housing 212 preferably is pultruded separately from beam 202. Axle connection housing 212 is pultruded parallel to axle 28 and accepts rear end 214 of beam 202. Axle connection housing 212 immovably captures axle tube 30. Beam 202 is generally press fit into an opening 204 formed in the front portion of axle connection housing 212 and can be secured via fasteners such as a bolt 222. It is important to note that the separate manufacture of axle connection housing 212 from beam 202 through pultrusion is different than prior art composite beams and corresponding brackets that require vacuum injection molding or reaction injection molding and allows for more cost-effective production. It is further contemplated that beam 202 alternatively may be secured to axle connection housing 212 with an adhesive known by those in the art.

To connect a front end 216 of beam 202 of the present invention to hanger 18, a bushing end housing 218 or bracket is utilized with a bushing assembly 220. Similar to the manufacture of axle connection housing 212, bushing end housing 218 is preferably pultruded parallel to the transverse length of axle 28 and separately from beam 202. Beam 202 is press fit into an opening 206 formed in the rear portion of bushing end housing 218 and can be secured via fasteners such as a bolt 224. Bushing assembly 220 includes a rigid tube (not shown) with a rubber bushing that is slip-fit into a cylindrical member opening (not shown) within bushing end housing 218. The rubber bushing of the rigid tube may be of minimal compliance as a result of the structure of beam 202, as compared to the specialized compliant bushing employed in the prior art. The rigid tube receives a bolt (not shown) that extends through the pivot bushing, hanger sidewall openings, a spacer (not shown), an eccentric alignment member (not shown) that optionally is used to align the bushing assembly as known in the art, and washers (not shown). A respective one of a pair of nuts (not shown) threadably engages each of the bolts (not shown) to secure the above-described components of bushing assembly 220 and thus provides pivotal connection between beam 202 and hanger 18. Bushing assembly 220 is more fully described in a separate U.S. patent owned by the same assignee, Hendrickson USA, L.L.C., bearing the U.S. Pat. No. 7,731,211.

As can be seen from the detailed description of the structure of beam 202, as well as the installation of the beam as part of axle/suspension system 200, the beam is lightweight as a result of outer shell 203 and support 208. The reduced weight desirably reduces operating costs. In addition, beam 202 balances the competing demands of rigidity for roll stability and flexibility for compliance. Shell 203 and support 208 provide structure that is strong, yet flexible. Moreover, beam 202 reduces the possibility of delamination of the composite material by utilizing at least one vertical reinforcing fiber 207 (FIG. 5). Reinforcing fiber 207 acts to bind shell 203 and support 208 and any other layers. Even further, support 208 (FIG. 5) facilitates to balance the competing demands of rigidity for roll stability and flexibility for compliance. Additionally, beam 202, axle connection housing 212, and bushing end housing 218 are each preferably formed in separate pultrusion processes allowing for more cost-effective production.

It is to be understood that the structure and arrangement of the above-described heavy-duty vehicle axle/suspension system 200 with composite beam 202 of the present invention may be altered or rearranged without affecting the overall concept or operation of the invention. For example beams 202 may include shapes other than the rectangular shape shown and described above. Support 208 may include any number or combination of layers. Axle connection housing 212 and bushing end housing 218 may attach to beam 202 in manners other than press-fit known to those skilled in the art, such as bolting or adhering. Axle connection housing 212 and bushing end housing 218 may include different types of connecting structures, including a bracket. Reinforcing fiber 207 may include different types of materials known to those skilled in the art. Openings 210 may include shapes other than the circular shape shown and described above and each opening may be placed in different locations on beam 202. Support 208 may include materials other than foam resin, known to those skilled in the art, and reinforcing fiber 207 may be oriented in a different manner in relation to beam 202. Beam 202 may include other materials known to those in the art, and shell 203 may include mats of fibers oriented at angles other than those described above. Beam 202 may be utilized with other types of axle/suspension systems, including leading and trailing arm axle/suspension systems, in a manner known to those skilled in the art.

Accordingly, the heavy-duty vehicle axle/suspension system with composite beam is simplified, provides an effective, safe, inexpensive and efficient structure and method which achieves all the enumerated objectives, provides for eliminating difficulties encountered with prior art axle/suspension system, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the heavy-duty vehicle axle/suspension system with composite beam is installed and used, the characteristics of the construction, arrangement and method steps, and the advantageous, new and useful results obtained; the new and useful structures, devices, elements, arrangements, process, parts and combinations are set forth in the appended claims.

What is claimed is:

1. An axle/suspension system for a heavy-duty vehicle, said vehicle having a frame extending in a longitudinal direction relative to the vehicle, said axle/suspension system being attached to said vehicle frame by at least one hanger, the axle/suspension system comprising:
   an axle extending in a transverse direction relative to said vehicle;
   at least one beam including a first end and a second end, said beam being formed of a composite material and being formed with a plurality of vertically-extending openings;
   at least one fiber, said fiber extending through at least one of said vertically-extending openings;
   an axle connection housing extending between and being rigidly connected to said second end of said beam and said axle; and
   a bushing end housing extending between and being connected to said first end of said beam and said hanger.

2. The axle/suspension system of claim 1, wherein said beam includes an outer shell.

3. The axle/suspension system of claim 2, wherein said outer shell includes a plurality of mats.

4. The axle/suspension system of claim 3, wherein said plurality of mats are oriented at 0, 90, and 45 degrees.

5. The axle/suspension system of claim 4, wherein said plurality of mats include a consistent cross-section in a transverse direction to said frame.

6. The axle/suspension system of claim 2, further comprising a support disposed within said beam shell.

7. The axle/suspension system of claim 6, wherein said support is a foam material.

8. The axle/suspension system of claim 6, wherein said fibers extend through said shell and said support.

9. The axle/suspension system of claim 1, wherein said fibers are reinforcing members.

10. The axle/suspension system of claim 1, wherein said axle connection housing captures said axle.

11. The axle/suspension system of claim 10, wherein said beam second end is press fit into said axle connection housing.

12. The axle/suspension system of claim 11, wherein said beam is secured to said axle connection housing by mechanical fasteners.

13. The axle/suspension system of claim 1, wherein said bushing end housing further comprises a bushing assembly.

14. The axle/suspension system of claim 1, wherein said beam first end is press fit into said bushing end housing.

15. The axle/suspension system of claim 14, wherein said beam is secured to said bushing end housing by mechanical fasteners.

16. The axle/suspension system of claim 1, wherein said beam, said axle connection housing, and said bushing end housing are each separately formed.

17. The axle/suspension system of claim 16, wherein each of said beam, said axle connection housing, and said bushing end housing are manufactured by pultrusion.

18. The axle/suspension system of claim 17, wherein said bushing end housing is pultruded parallel to the transverse length of said axle.

19. The axle/suspension system of claim 17, wherein said axle connection housing is pultruded parallel to said axle.

20. The axle/suspension system of claim 1, wherein said beam includes a thermoset polymer.

21. The axle/suspension system of claim 1, wherein said at least one fiber includes a plurality of fibers.

22. The axle/suspension system of claim 1, wherein said at least one fiber includes a continuous fiber.

* * * * *